United States Patent
Blunier (10) Patent No.: US 10,104,823 B2
(45) Date of Patent: Oct. 23, 2018

(54) VERTICAL TILLAGE SCRAPER

(71) Applicant: CNH Industrial America LLC, New Holland, PA (US)

(72) Inventor: Timothy R. Blunier, Danvers, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/711,346

(22) Filed: Sep. 21, 2017

(65) Prior Publication Data

US 2018/0007822 A1    Jan. 11, 2018

Related U.S. Application Data (62) Division of application No. 14/840,940, filed on Aug. 31, 2015, now Pat. No. 9,801,321.

(51) Int. Cl.
| | | |
|---|---|---|
| *A01B 71/08* | (2006.01) | |
| *A01B 15/16* | (2006.01) | |
| *A01B 23/06* | (2006.01) | |

(52) U.S. Cl.
CPC .............. *A01B 15/16* (2013.01); *A01B 23/06* (2013.01); *A01B 71/08* (2013.01)

(58) Field of Classification Search
CPC ................................ A01B 15/16; A01B 71/08
USPC .................. 172/66, 558, 560, 561, 606, 610
See application file for complete search history.

(56) References Cited

U.S. PATENT DOCUMENTS

| | | | |
|---|---|---|---|
| 299,057 A | | 5/1884 | Crowley |
| 373,278 A | | 11/1887 | Elliott |
| 395,994 A | | 1/1889 | Parmeter |
| 467,862 A | * | 1/1892 | Merrick ................. A01B 23/06 |
| | | | 172/558 |
| 501,917 A | | 7/1893 | Caldwell |
| 507,312 A | * | 10/1893 | Daley .................... A01B 23/06 |
| | | | 172/558 |
| 715,910 A | | 12/1902 | Walton |
| 866,622 A | | 9/1907 | Christman et al. |
| 905,786 A | | 12/1908 | Biesenthal |
| 1,072,119 A | | 9/1913 | Hill |
| 1,124,006 A | | 1/1915 | Gallespie |
| 1,171,556 A | | 2/1916 | Swanson |
| 1,225,400 A | | 5/1917 | Black |
| 1,410,883 A | | 3/1922 | Bozard |
| 1,415,674 A | | 5/1922 | Mitchell |
| 1,545,564 A | | 7/1925 | Krotz |

(Continued)

*Primary Examiner* — Gary S Hartmann
(74) *Attorney, Agent, or Firm* — Rebecca L. Henkel; Richard K. DeMille (57) ABSTRACT

An agricultural tillage implement has a disk frame assembly connected to a pull hitch extending in a travel direction with frame members extending generally laterally with respect to the travel direction. At least one disk blade is connected to and supported by the frame members to till soil over which the agricultural tillage implement traverses. A disk scraper mounting member is connected to at least one frame member. A channel shaped disk scraper is connected to the disk scraper mounting member using a bolted joint connection. The channel shaped disk scraper has a square mounting end adjoining an inner perpendicular surface of the disk scraper mounting member. The channel shaped disk scraper is operable to scrape residue from the at least one disk blade and deflect it away from the travel direction.

9 Claims, 8 Drawing Sheets

(56) References Cited

U.S. PATENT DOCUMENTS

| | | |
|---|---|---|
| 2,489,930 A | 11/1949 | Reahard |
| 3,438,448 A | 4/1969 | Richey |
| 4,008,770 A | 2/1977 | Boone |
| 4,113,030 A | 9/1978 | Walker |
| 4,330,041 A | 5/1982 | Andenman |
| 4,858,699 A | 8/1989 | Poltrock |
| 4,998,488 A | 3/1991 | Hansson |
| 5,318,133 A | 6/1994 | Logue |
| 5,626,196 A | 5/1997 | Hughes |
| 7,997,218 B2 | 8/2011 | Gengler |
| 8,104,543 B2 | 1/2012 | Hesla |
| 9,801,321 B2 * | 10/2017 | Blunier ................. A01B 15/16 |

* cited by examiner

VERTICAL TILLAGE SCRAPER

CROSS REFERENCE TO RELATED APPLICATIONS

This non-provisional divisional patent application takes priority from non-provisional patent application Ser. No. 14/840,940, filed Aug. 31, 2015, entitled "VERTICAL TILLAGE SCRAPER," which is hereby incorporated by reference in its entirety.

BACKGROUND OF THE INVENTION

1. Field of the Invention

The present invention relates to agricultural implements, and, more particularly, to agricultural field tillage implements.

2. Description of the Related Art

Farmers utilize a wide variety of tillage implements to prepare soil for planting. In one type of tilling operation, rows or gangs of circular disk blades are pulled through the soil at variable depths to break up clods or lumps of soil, as well as old plant material to provide a more amenable soil structure for planting and to level the soil surface. The gangs of disks are arranged on frames that extend generally laterally with respect to the direction of movement through a field and more particularly are angled with respect to the direction of movement. Such tillage operations may include disk harrows, disk rippers, or vertical tillage.

As tillage operations have been developed to be more efficient, the implements are called upon to operate in increasingly extreme conditions. At the same time, the tillage implements are being expanded in size to provide greater efficiency in processing the soil. Tillage implements are often expected to operate in wetter conditions to minimize the effect of weather on the farming operation. Under these conditions, there is a tendency for soil and residue to accumulate on the disk blades. Accumulation of this type of material prevents smooth flow of soil and residue through the equipment, and more particularly between adjacent disk blades and between associated equipment structures, such as frame members. Operators then have to remove the obstructions by raising the implement out of the ground or removing the accumulated soil and residue by hand. All these factors result in making the tillage operation less efficient and cost effective.

In order to prevent soil accumulation within and between rows or gangs of circular disk blades, it is known in the prior art to utilize disk scrapers of various configurations, including in some cases channel shaped disk scrapers. However, each of these prior art configurations shares certain detrimental characteristics. In particular, prior art disk scrapers must be manually oriented to the individual disk blades of the gangs of disk blades, and after significant use tend to turn away from the disk blades, thereby reducing the efficiency of the scraping action, or even interfere with the disk blades resulting in breakage. Also, during heavy or muddy use, the prior art disk scrapers tend to bend backwards or otherwise deform, particularly at their mounting locations, thereby eliminating effective scraping action and resulting in soil-plugged disk gangs and even loss of the disk scraper part from the machine.

What is needed therefore in the art is a tilling implement that minimizes build up of soil and residue on the gangs of disk blades without additional and complicated mechanisms. What is further needed in the art is a more robust disk scraper solution which maintains correct orientation between the disk scraper and the individual disk blades of the gangs of disk blades and eliminates excessive disk scraper failure. The disk scraper solution needs to be simple and cost effective, while providing a rigid disk scraper that can be manufactured efficiently.

SUMMARY OF THE INVENTION

The present invention provides channel shaped disk scrapers mounted in such a way as to provide a robust disk scraper solution that maintains correct orientation between the disk scraper and the individual disk blades of the gangs of disk blades, while eliminating excessive disk scraper failure. The disk scraper solution is simple and cost effective, while providing a rigid disk scraper that can be manufactured efficiently.

The invention in one form is directed to an agricultural tillage implement having a disk frame assembly connected to a pull hitch extending in a travel direction. The disk frame assembly has at least one frame member extending generally laterally with respect to the travel direction. At least one disk blade is connected to and supported by the at least one frame member to till soil over which the agricultural tillage implement traverses. At least one disk scraper mounting member is connected to the at least one frame member. At least one channel shaped disk scraper is connected to the at least one disk scraper mounting member using a bolted joint connection. The at least one channel shaped disk scraper has a square mounting end adjoining an inner perpendicular surface of the at least one disk scraper mounting member. The at least one channel shaped disk scraper is operable to scrape residue from the at least one disk blade and deflect it away from the travel direction.

The invention in another form is directed to a disk scraper assembly for an agricultural tillage implement. The agricultural tillage implement has a disk frame assembly connected to a pull hitch extending in a travel direction. The disk frame assembly has at least one frame member extending generally laterally with respect to the travel direction. At least one disk blade is connected to and supported by the at least one frame member to till soil over which the agricultural tillage implement traverses. At least one disk scraper mounting member is connected to the at least one frame member. At least one channel shaped disk scraper is connected to the at least one disk scraper mounting member using a bolted joint connection. The at least one channel shaped disk scraper has a square mounting end adjoining an inner perpendicular surface of the at least one disk scraper mounting member. The at least one channel shaped disk scraper is operable to scrape residue from the at least one disk blade and deflect it away from the travel direction.

The invention in another form is directed to a method of connecting clearing field residue from an agricultural tillage implement. The agricultural tillage implement has a disk frame assembly connected to a pull hitch extending in a travel direction. The disk frame assembly has at least one frame member extending generally laterally with respect to the travel direction. At least one disk blade is connected to and supported by the at least one frame member to till soil over which the agricultural tillage implement traverses. The method has several steps. The first step is connecting at least one disk scraper mounting member to the at least one frame member. The second step is connecting at least one channel shaped disk scraper to the at least one disk scraper mounting member using a bolted joint connection. The at least one channel shaped disk scraper has a square mounting end adjoining an inner perpendicular surface of the at least one disk scraper mounting member. The at least one channel shaped disk scraper is operable to scrape residue from the at least one disk blade and deflect it away from the travel direction.

An advantage of the present invention is that the disk blades and their support elements are kept substantially free of soil and residue. A further advantage of the present invention is that the disk scraper is firmly oriented and located relative to the individual disk blades of the gangs of disk blades, while preserving the ability to replace the disk scrapers as they wear out. No manual orientation or readjustment of the disk scrapers is required, and movement of the disk scrapers away from or towards the individual disk blades, or bending, deformation, and loss is minimized. Operating loads upon the disk scrapers are efficiently transferred to their mountings without overly stressing bolted joint connections, thereby minimizing deformation at the bolted joint connections and resultant movement or loss of the disk scrapers. Thinner material can be used, along with more production friendly forming processes.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
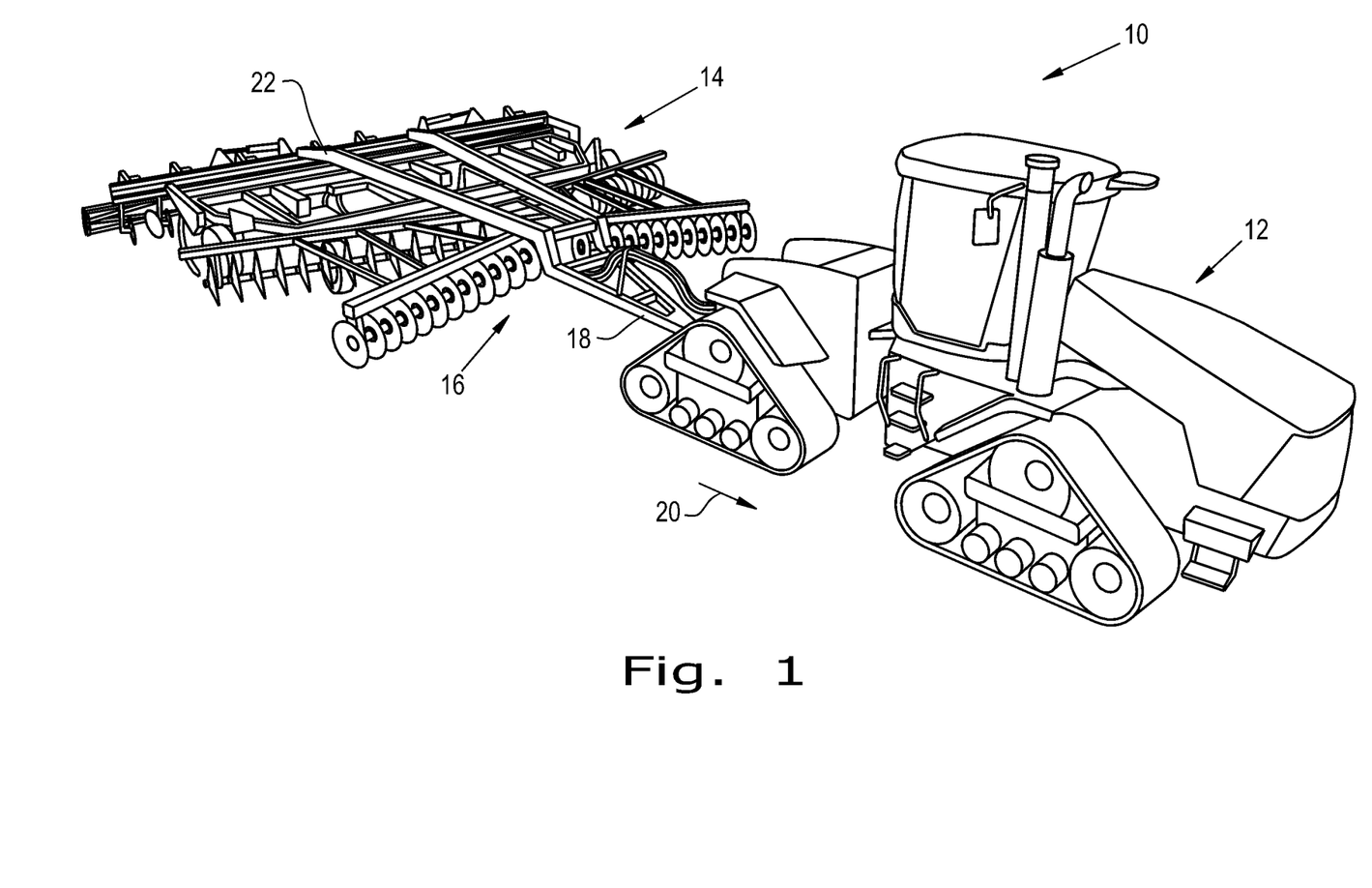
FIG. 1 is an isometric view of a tillage apparatus including a tractor and an agricultural tillage implement according to an embodiment of the present invention.

Referring now to the drawings, and more particularly to FIG. 1, there is shown a tillage apparatus 10 which generally includes a tractor 12 and an agricultural tillage implement 14 for tilling and finishing soil prior to seeding.

Figure 2:
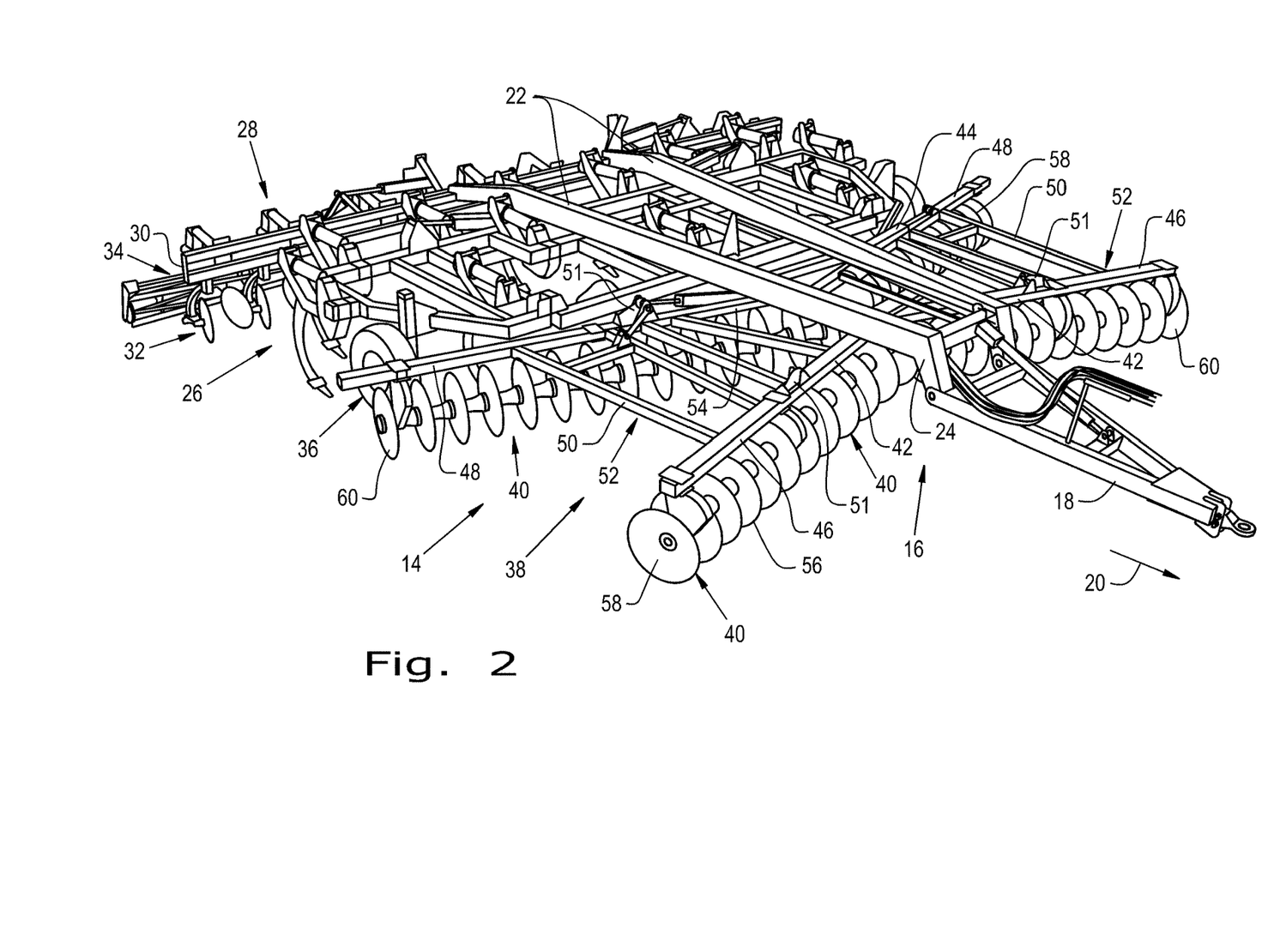
FIG. 2 is an isometric view of an agricultural tillage implement according to an embodiment of the present invention.

Now, additionally referring to FIG. 2, an agricultural tillage implement 14 shown is configured as a multi-section field disk ripper 14, and includes a carriage frame assembly 16. Carriage frame assembly 16 is the section that is directly towed by a traction unit, such as agricultural tractor 12. Although for the sake of illustration the agricultural tillage implement 14 is shown as a multi-section field disk ripper, an agricultural tillage implement 14 contemplated as being within the scope of the present invention may take the form of any disk harrow, disk ripper, in-line ripper, strip-till, or vertical tillage implement using disk blades.

Carriage frame assembly 16 includes a pull hitch 18 generally extending in a travel direction 20, and forward and aft directed carrier frame members 22 which are coupled with and extend from pull hitch 18. Reinforcing gusset plates 24 may be used to strengthen the connection between pull hitch 18 and carrier frame members 22. Carriage frame assembly 16 generally functions to carry a shank frame 26 for tilling the soil, and a rear implement 28 for finishing the soil. Rear implement 28 includes a secondary frame 30, leveling blades 32 and rolling (aka, crumbler) basket assemblies 34, which co-act with each other to finish the soil in preparation for planting. Leveling blades 32 and rolling basket assemblies are both attached to secondary frame 30. Wheels 36, only one of which is shown, are actuated from tractor 12 to raise or lower the carrier frame members 22 to place the tillage apparatus in a transport position with the wheel assemblies 36 supporting the implement above the ground and an operating position in which the tillage equipment is used to till the soil.

A disk frame assembly 38 provides support for gangs of disk blades 40. The disk frame assembly 38 includes forward and aft inner frame members 42 and 54, respectively, and includes forward and aft outer frame members 46 and 48, respectively. Forward and aft inner frame members 42 and 54 are structurally interconnected by a central frame element 44. Forward and aft inner frame members 42 and 54, and forward and aft outer frame members 46 and 48 are structurally interconnected by longitudinal stringers 50 to reinforce the frame members 42, 46, 48, and 54 to establish the disk frame assembly 38 in substantially a single plane when in operation. A plurality of pivot joints 51 are positioned between forward inner frame members 42 and forward outer frame members 46, and between aft inner frame members 54 and aft outer frame members 48, so as to provide pivoting support for wing sections 52. Wing sections 52 are pivoted between a field operating position in which they are generally horizontal with respect to the disk frame 38 and a transport position in which they are pivoted out of the plane for appropriate road clearance during the transport mode. The gangs of disk blades 40 each have individual disk blades 56 having a concave side 58 and convex side 60. As can be seen in FIGS. 1 and 2, the gangs of disk blades 40 are at an angle with respect to the travel direction 20. This promotes a more effective tilling of the soil.

Figure 3A:
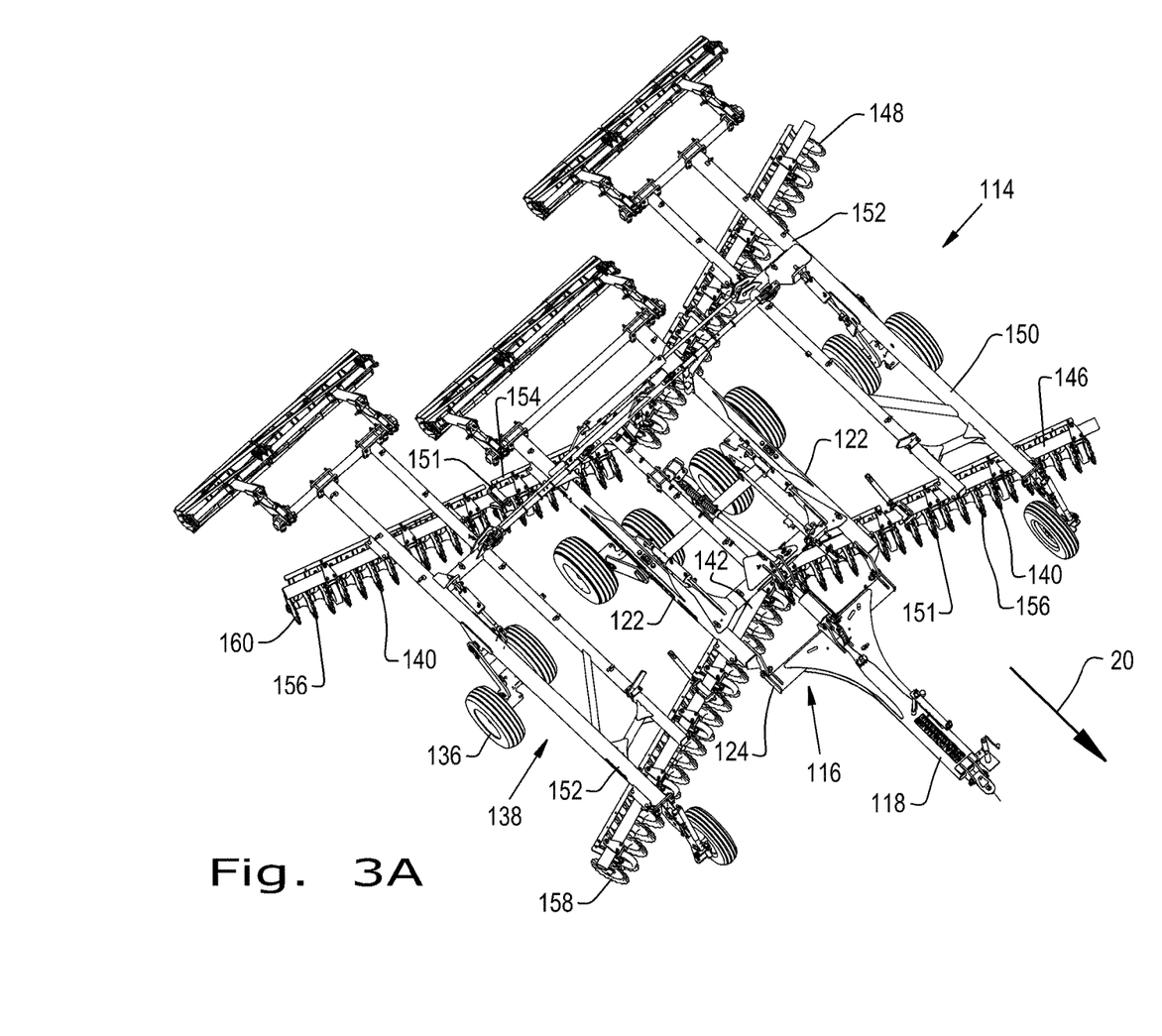
FIG. 3A is an isometric view of an agricultural tillage implement according to an embodiment of the present invention.
Figure 3B:
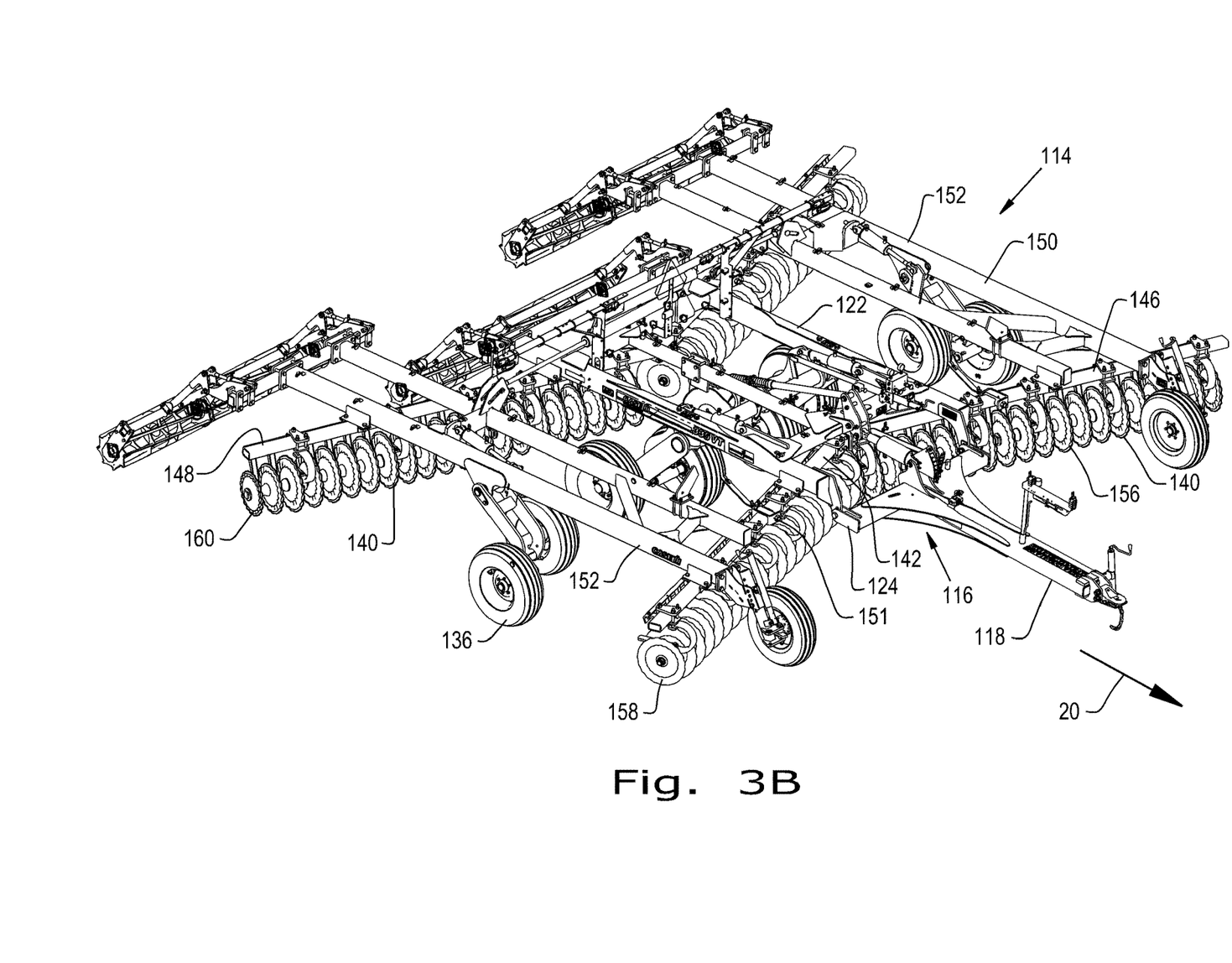
FIG. 3B is an isometric view of an agricultural tillage implement according to an embodiment of the present invention.
Figure 3C:
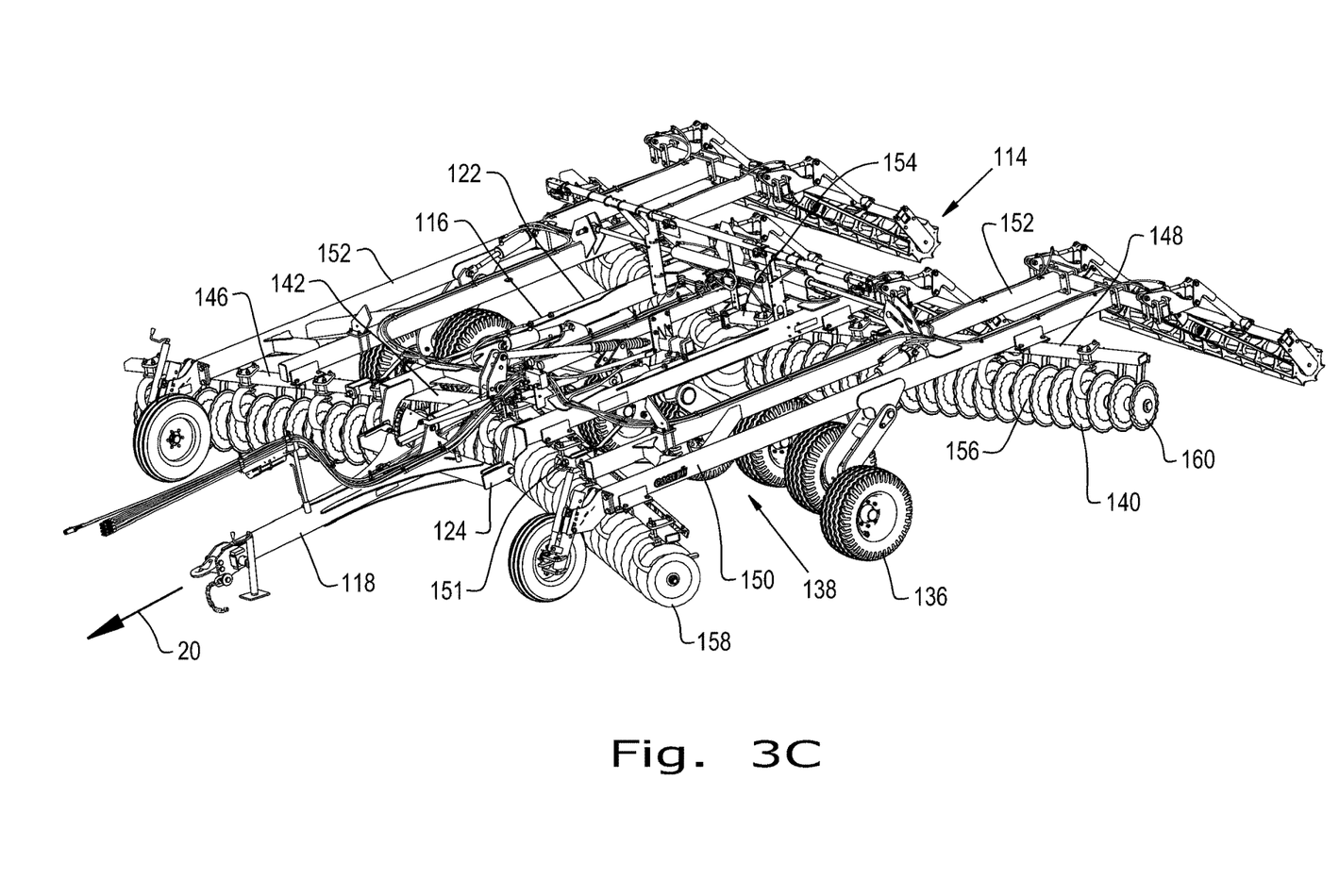
FIG. 3C is an isometric view of an agricultural tillage implement according to an embodiment of the present invention.

Now, additionally referring to FIGS. 3A, 3B, and 3B another agricultural tillage implement 114 is shown, this time configured as a vertical tillage implement 114, again including a carriage frame assembly 116 with a pull hitch 118 generally extending in a travel direction 20, and forward and aft directed carrier frame members 122 which are coupled with and extend from pull hitch 18. Reinforcing gusset plates 124 may be used to strengthen the connection between pull hitch 118 and carrier frame members 122. Wheels 136 are again actuated from tractor 12 to raise or lower the carrier frame members 122 to place the tillage apparatus in a transport position with the wheel assemblies 136 supporting the implement above the ground and an operating position in which the tillage equipment is used to till the soil.

A disk frame assembly 138 again provides support for gangs of disk blades 140, and again includes forward and aft inner frame members 142 and 154, respectively, and forward and aft outer frame members 146 and 148, respectively, structurally interconnected by longitudinal stringers 150 to reinforce the frame members 142, 146, 148, and 154 to establish the disk frame assembly 138 in substantially a single plane when in operation. A plurality of pivot joints 151 are positioned between forward inner frame members 142 and forward outer frame members 146, and between aft inner frame members 154 and aft outer frame members 148, so as to provide pivoting support for wing sections 152. The gangs of disk blades 140 each have individual disk blades 156 having a concave side 158 and convex side 160. The gangs of disk blades 140 are again at an angle with respect to the travel direction 20.

Figure 4:
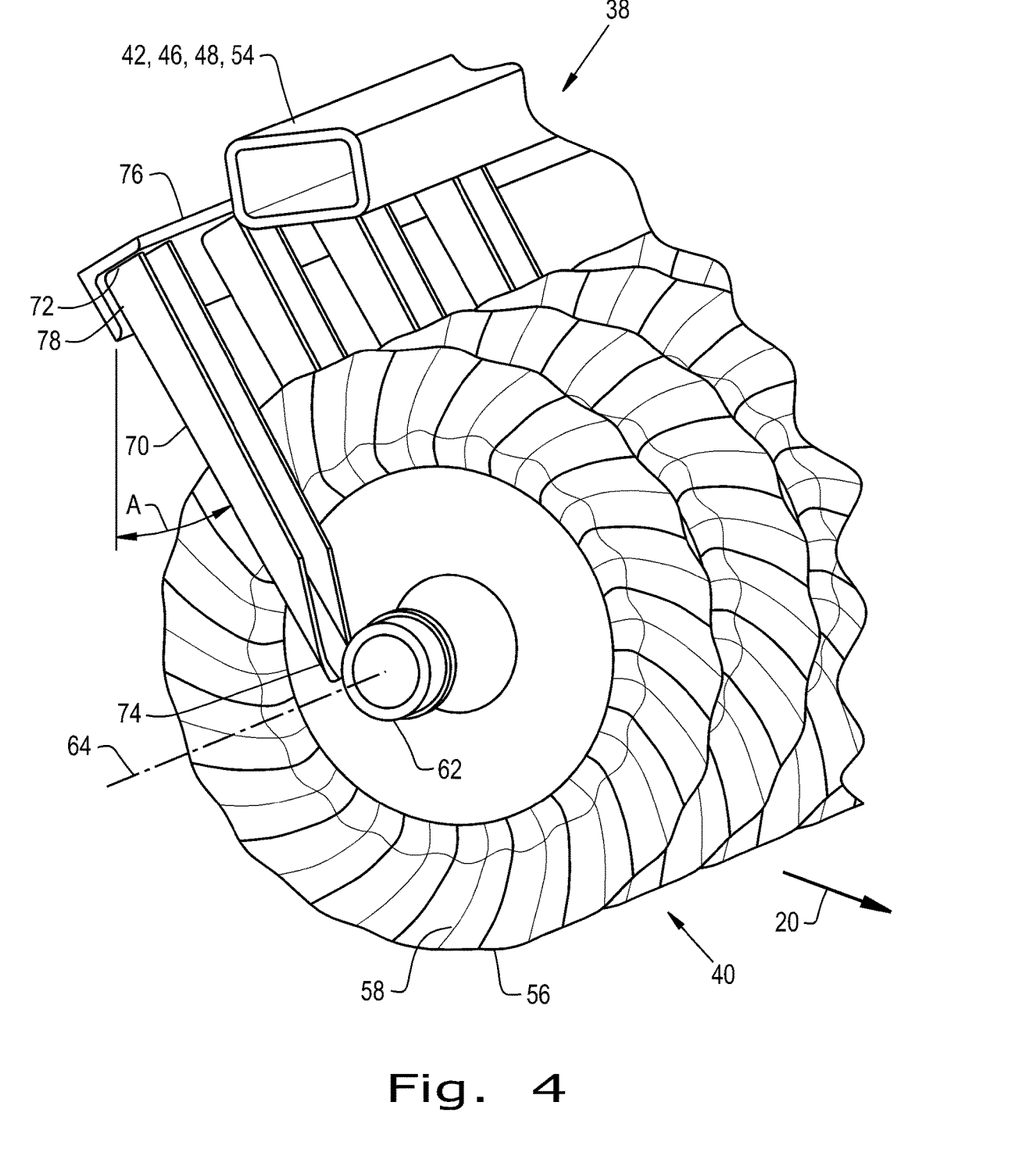
FIG. 4 is a partial front isometric view of a gang of disk blades equipped with disk scrapers according to an embodiment of the present invention.
Figure 5:
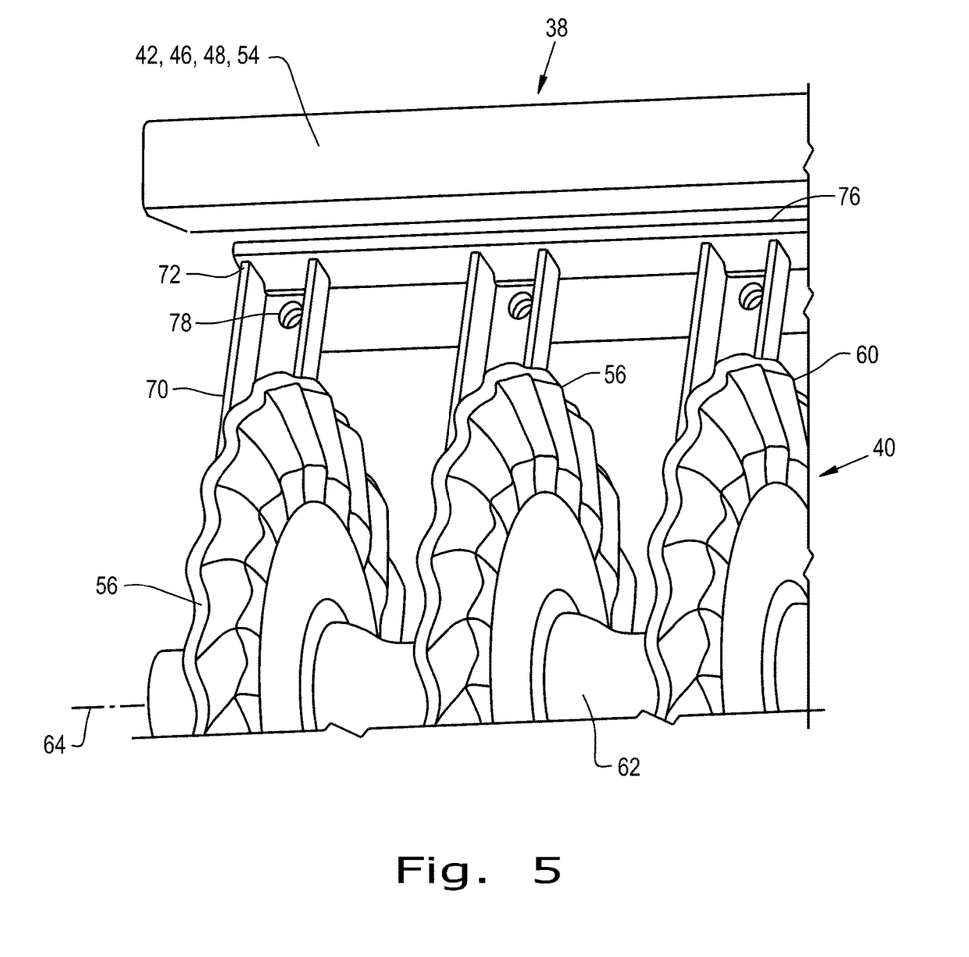
FIG. 5 is another partial front isometric view of a gang of disk blades equipped with disk scrapers according to an embodiment of the present invention.
Figure 6:
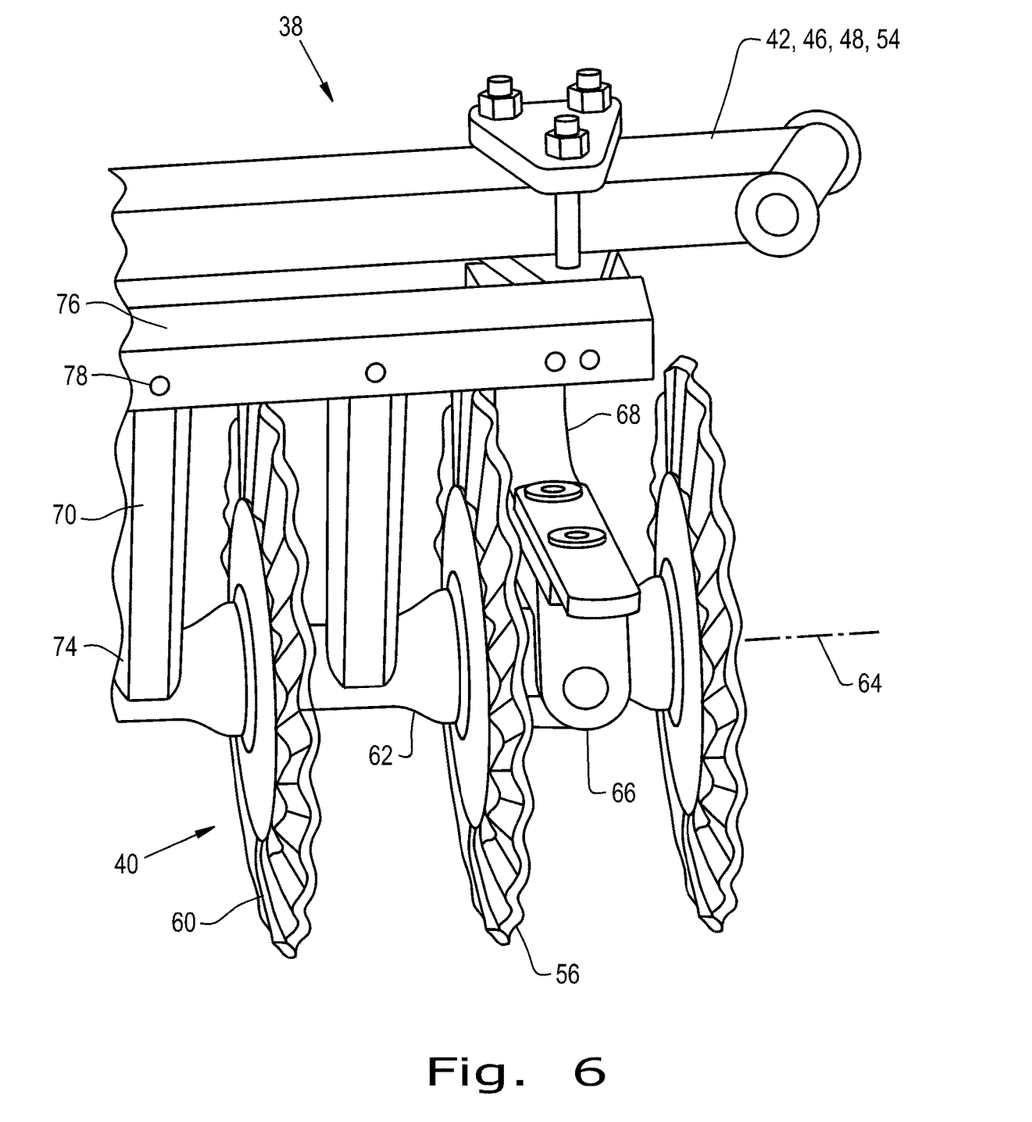
FIG. 6 is a partial rear isometric view of a gang of disk blades equipped with disk scrapers according to an embodiment of the present invention.

Turning now to FIGS. 4 through 6, being recited for the sake of simplicity as applicable to the agricultural tillage implement shown in FIG. 2 but also analogously applicable to the agricultural tillage implement shown in FIGS. 3A, 3B, and 3C, the individual disk blades 56 of each of the gangs of disk blades 40 are spaced apart on a central shaft assembly 62, which interconnects the individual disk blades 56 and allows them to rotate about a common axis 64. At periodic intervals along the gangs of disk blades 40, there are positioned bearing hanger assemblies 66 mounted to and supported from the frame members 42, 46, 48, and 54 including C-shaped structures 68. The C-shaped structures 68 provide a degree of flexibility resiliency for the gangs of disk blades 40 to improve tillage operations.

In accordance with the present invention, channel shaped disk scrapers 70 are positioned between each individual disk blade 56 rearward of the central shaft assembly 62 upon which the individual disk blades 56 rotate, with respect to travel direction 20. Each channel shaped disk scraper 70 is attached to a disk scraper mounting member 76 by way of a bolted joint connection 78. There may be a separate disk scraper mounting member 76 for each gang of disk blades 40 or of which there may be one disk scraper mounting member 76 for more than none gang of disk blades 40 or for each frame member 42, 46, 48, and 54. Each disk scraper mounting member 76 is connected to a frame member 42, 46, 48, or 54. The connection of the disk scraper mounting members 76 to the frame members 42, 46, 48, or 54, may be through part of the bearing hanger assemblies 66, either at the connection between the bearing hanger assembly 66 and the frame member 42, 46, 48, or 54, as shown in FIG. 6, or through a bracket (not shown) connecting the disk scraper mounting members 76 to the lower portion of the C-shaped structure 68 where it connects to the bearing hanger assembly 66. Alternately, the connection of the disk scraper mounting members 76 to the frame members 42, 46, 48, or 54 may be directly to the frame members 42, 46, 48, or 54. In this way, the disk scraper mounting member 76 and channel shaped disk scrapers 70 may be rigidly connected to the frame members 42, 46, 48, or 54, or may be resiliently mounted by the C-shaped structures 68 to move along with the gangs of disk blades 40.

Each disk scraper mounting member 76 is mounted such that the channel shaped disk scrapers 70 attached thereto describe an acute angle "A" of attack between the channel shaped disk scrapers 70 and the tangent line between the individual disk blades 56 and the connection 78 of the channel shaped disk scrapers 70 to the disk scraper mounting member 76. Further, each disk scraper mounting member 76 may be mounted so that the angle "A" of attack is adjustable. As a result, the movement of the agricultural tillage implement 14 through the field causes the individual disk blades 56 to rotate in a clockwise direction as viewed in FIG. 4 so that the channel shaped disk scraper scraping ends 74 of the channel shaped disk scrapers 70 scrape any accumulated soil and residue from the concave and convex sides 58, 60 of individual disk blades 56 and deflect it away from the travel direction 20.

Each channel shaped disk scraper 70 is connected to the disk scraper mounting member 76 using a bolted joint connection 78, as noted previously. Further, each channel shaped disk scraper 70 is provided with a square mounting end 72 which adjoins to the inner surface of the disk scraper mounting member 76. In this way, the channel shaped disk scraper 70 is firmly oriented and located relative to the disk scraper mounting member 76 and thus firmly oriented and located relative to the individual disk blades 56 of the gangs of disk blades 40, while preserving the ability to replace the channel shaped disk scrapers 70 as they wear out. This mating of the square mounting ends 72 of the channel shaped disk scrapers 70 with the inner surface of the disk scraper mounting member 76 thereby prevents the problems of having to manually orient the disk scrapers, movement of the disk scrapers away from or towards the individual disk blades, and bending, deformation, and loss associated with prior art disk scrapers. Note that the disk scraper mounting member 76 is shown as an angle shaped mounting member, although other shapes of mounting members 76 are contemplated, such as channel shaped, Z shaped, or hat shaped, provided that the square mounting end 72 adjoins an inner perpendicular surface of the mounting member 76.

The disk scraper mounting member 76, the channel shaped disk scrapers 70, and the bolted joint connections 78 wherein the square mounting end 72 of the channel shaped disk scraper 70 adjoins the inner surface of the disk scraper mounting member 76 further provides additional design advantages. Operating loads upon the channel shaped disk scrapers 70 along their lengths are efficiently transferred to the disk scraper mounting member 76 without overly stressing the bolted joint connections 78 due to the greater surface area of contact at the square mounting ends 72. This minimizes deformation at the bolted joint connections 78 and resultant movement or loss of the channel shaped disk scrapers 70. As a result, the relative bending and torsional rigidity of the channel shaped disk scrapers 70 can be utilized to greater advantage, allowing the use of thinner material and more production friendly processes such as stamping the channel shaped disk scrapers 70 or forming them on progressive dies. Making the channel shaped disk scrapers 70 out of thinner material also allows for a sharper disk scraper scraping end 74.

Finally, while the bolted joint connections 78 with the square mounting end 72 of the channel shaped disk scraper 70 adjoining the inner surface of the disk scraper mounting member 76 provides the firm orientation and location of the channel shaped disk scrapers 70 and efficiently transfers operating loads from the channel shaped disk scrapers 70 to the disk scraper mounting member 76, the relative torsional compliance of the disk scraper mounting member 76 itself helps to absorb impacts, further minimizing the potential for deformation at the bolted joint connections 78.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A disk scraper assembly for an agricultural tillage implement, said agricultural tillage implement having a disk frame assembly connected to a pull hitch extending in a travel direction, the disk frame assembly having at least one frame member extending generally laterally with respect to the travel direction, the disk assembly comprising:
    at least one pair of disk blades connected to and supported by the at least one frame member, each disk blade operably connected to and supported by the at least one frame member so that the at least one pair of disk blades are positioned to till soil over which the agricultural tillage implement traverses;
    at least one disk scraper mounting member connected to the at least one frame member; and
    at least one disk scraper connected to the at least one disk scraper mounting member using a bolted joint connection, the at least one disk scraper having a mounting end connected to a surface of the at least one disk scraper mounting member, the at least one disk scraper positioned and extending between the at least one pair of disk blades, the at least one disk scraper operable to simultaneously scrape residue from one surface of each disk blade of the at least one pair of disk blades and deflect the residue away from the travel direction, wherein a scraping end of the at least one disk scraper is configured to extend no lower than a central shaft which extends through each disk blade,
    wherein the at least one disk scraper includes a flat portion extending from the mounting end to the scraping end which is formed in a flat plane,
    wherein the at least one disk scraper mounting member is adjustable to adjust an angle of the at least one disk scraper, and
    wherein the at least one disk scraper includes two spaced-apart side wails connected to the at least one disk scraper at the mounting end, the two spaced-apart side walls formed to extend along the at least one disk scraper to taper and end near the scraping end such that the scraping end extends therebeyond in the flat plane.

2. The disk scraper assembly of claim 1, wherein:
    each disk blade includes a convex surface near an edge on one side, and a concave surface near the edge on and opposite side, and the at least one disk scraper is positioned near the convex surface of one disk blade and near the concave surface of the other disk blade to scrape residue extending therefrom.

3. The disk scraper assembly of claim 1, wherein:
    the at least one disk scraper mounting member is connected to the at least one frame member through at least one disk blade bearing hanger assembly, the at least one disk blade bearing hanger assembly further functioning to rotatably connect the at least one pair of disk blades to the at least one frame member.

4. The disk scraper assembly of claim 1, wherein:
    the at least one disk scraper mounting member is connected to the at least one frame member so that the at least one disk scraper is adjustable relative to the at least one pair of disk blades.

5. The disk scraper assembly of claim 4, wherein:
    the mounting end of the at least one disk scraper is connected to an adjoining inner perpendicular surface of the at least one disk scraper mounting member.

6. The disk scraper assembly of claim 1, wherein:
    the at least one pair of disk blades further comprises at least two gangs, each gang including at least one pair of disk blades, and
    wherein the at least one disk scraper mounting member further comprises a disk scraper mounting member associated with each pair of disk blades on each gang.

7. The disk scraper assembly of claim 1, wherein:
    the at least one frame member further comprises at least two frame members; and
    the at least one disk scraper mounting member further comprises a disk scraper mounting member associated with each of the at least two frame members.

8. The disk scraper assembly of claim 1, wherein:
    the agricultural tillage implement is one of a multi-section field disk ripper, a disk harrow, a disk ripper, an in-line ripper, a strip-till, and a vertical tillage implement using disk blades.

9. The disk scraper assembly of claim 1, wherein the scraping end of the at last one disk scraper is positioned to contact the residue when the implement is traveling in the travel direction, and wherein the at least one disk scraper is configured to be positioned such that the scraping end is positioned near a central shaft which extends through each disk blade in order to move residue away from the central shaft.

* * * * *